(12) United States Patent
Wang et al.

(10) Patent No.: US 9,019,606 B2
(45) Date of Patent: Apr. 28, 2015

(54) MULTILAYER THIN FILM ATTENUATORS

(75) Inventors: Ligang Wang, Penfield, NY (US);
Turan Erdogan, Spencerport, NY (US)

(73) Assignee: Semrock, Inc., Rochester, NY (US)

(*) Notice: Subject to any disclaimer, the term of this patent is extended or adjusted under 35 U.S.C. 154(b) by 1013 days.

(21) Appl. No.: 13/112,006

(22) Filed: May 20, 2011

(65) Prior Publication Data

US 2012/0293868 A1  Nov. 22, 2012

(51) Int. Cl.
| | |
|---|---|
| G02B 5/30 | (2006.01) |
| G02B 27/28 | (2006.01) |
| G02B 1/10 | (2006.01) |
| G02B 5/28 | (2006.01) |

(52) U.S. Cl.
CPC .............. *G02B 5/285* (2013.01); *G02B 27/281* (2013.01); *G02B 5/3041* (2013.01); *G02B 1/115* (2013.01)

(58) Field of Classification Search
CPC ...... G02B 1/115; G02B 5/285; G02B 5/3041; G02B 27/281
USPC .......... 359/485.01, 485.02, 485.03, 586, 588, 359/589, 585
See application file for complete search history.

(56) References Cited

U.S. PATENT DOCUMENTS

| | | | |
|---|---|---|---|
| 4,373,782 A | 2/1983 | Thelen | |
| 4,778,263 A | 10/1988 | Foltyn | |
| 5,383,199 A | 1/1995 | Laudenslager et al. | |
| 5,926,317 A | 7/1999 | Cushing | |
| 6,609,795 B2* | 8/2003 | Weber et al. | 353/20 |
| 6,809,859 B2* | 10/2004 | Erdogan et al. | 359/359 |
| 7,068,430 B1 | 6/2006 | Clarke et al. | |
| 7,123,416 B1* | 10/2006 | Erdogan et al. | 359/589 |
| 7,327,518 B2 | 2/2008 | Hodgson et al. | |
| 8,817,371 B1* | 8/2014 | Boothroyd et al. | 359/485.02 |
| 8,879,150 B1* | 11/2014 | Wang et al. | 359/485.03 |
| 2005/0110999 A1* | 5/2005 | Erdogan et al. | 356/417 |

(Continued)

OTHER PUBLICATIONS

Gu and Zheng, "Design of non-polarizing thin film edge filters" Journal of Zhejiang University Science A (2006) 7(6) pp. 1037-1040.

(Continued)

*Primary Examiner* — Ricky D Shafer
(74) *Attorney, Agent, or Firm* — Louis S. Horvath

(57) ABSTRACT

An optical element has layers formed on a substrate, including alternating first and second layers having first and second refractive indices, $n_L$ and $n_H$ that exhibit a spectral characteristic, providing, for incident light at a predetermined wavelength and directed toward the optical element within a range of angles bounded by first and second incident angles $\theta_1$ and $\theta_2$, between 0 and 80 degrees and differing by at least 1 degree, substantially linear polarization-averaged attenuation of the incident light energy wherein, for any incident angle $\theta_n$ between $\theta_1$ and $\theta_2$, $A\theta_n$ is the corresponding polarization-averaged attenuation, and wherein the polarization-averaged attenuation at $A\theta_n$ at angle $\theta_1$ is less than or equal to an optical density value of 0.2 and the polarization-averaged attenuation $A\theta_n$ at angle $\theta_2$ exceeds an optical density value of 4.

14 Claims, 13 Drawing Sheets

(56) References Cited

U.S. PATENT DOCUMENTS

| | | |
|---|---|---|
| 2006/0013271 A1 | 1/2006 | Wang |
| 2006/0028726 A1* | 2/2006 | Ushigome ............... 359/500 |
| 2007/0047081 A1 | 3/2007 | Hodgson et al. |
| 2008/0055584 A1* | 3/2008 | Pradhan et al. .......... 359/359 |
| 2008/0055716 A1* | 3/2008 | Erdogan et al. .......... 359/359 |
| 2008/0205845 A1 | 8/2008 | Wang et al. |
| 2008/0285130 A1 | 11/2008 | Mehl et al. |
| 2012/0099188 A1* | 4/2012 | Akozbek et al. .......... 359/360 |

OTHER PUBLICATIONS

Qi, Hong, Yi, Shao, Fan, "Nonpolarizing and polarizing filter design" Applied Optics, Apr. 20, 2005, pp. 2343-2348.

Chen and Gu, "Design of non-polarizing color splitting filters used for projection display system" Displays 26 (Apr. 2005) pp. 65-70.

* cited by examiner

MULTILAYER THIN FILM ATTENUATORS

FIELD OF THE INVENTION

This invention generally relates to variable optical attenuators and more particularly relates to an optical attenuator formed as a multilayer thin-film device and having reduced sensitivity to polarization.

BACKGROUND OF THE INVENTION

Variable light attenuators in the path of an emitted laser beam or other solid state light source enable efficient and stable operation of the light source while attenuating the light intensity to a suitable level for its application. A number of different approaches have been used for variable light attenuator design, including the use of spatially varying neutral density (ND) filters and other absorptive devices. One conventional method for variable light attenuation, as shown in FIG. 1A, employs the well known Malus' law. In this conventional arrangement, a laser attenuator 10 receives light from a laser light source 12, directed through a half-wave plate 14 and to a polarizing beamsplitter 16 or other polarizing element. Variable rotation of the half-wave plate about the optical axis enables a variable amount of the laser light to be transmitted through the polarizing element, with the remaining light directed to a light dump element 20 from the polarizing beamsplitter or absorbed by the polarizer.

Other attempts to develop variable laser light attenuators using multilayer thin-film technologies have proved disappointing. Among approaches that have been proposed is the use of a set of multilayer dielectric coated substrates having various reflectivity values. Each substrate is designed for a specific wavelength and provides a reflectance value for incident light of that wavelength. Installed at a slight angle to the beam, the attenuator reflects back some proportion of the light, as determined by the arrangement of dielectric layers.

One reason for the limited success of thin-film approaches relates to polarization. Practitioners in the optical arts have generalized the definitions of two mutually orthogonal polarization states as follows: light that has its polarization axis parallel to the plane of incidence is defined as having polarization state P, or P-polarized light; light that has its polarization axis perpendicular to the plane of incidence is defined as having polarization state S, or S-polarized light. For polarized light, the relative phase and amplitude of its P- and S-polarized components is fixed or constant. For un-polarized light, the relative phase and/or amplitude of P- and S-polarized components is random.

Conventional wisdom in thin-film design, reinforced by numerous practical examples, holds that multilayer thin-film surfaces are not polarization-neutral when light is not incident at a normal to the surface, but rather exhibit noticeable differences in their handling of light having different polarization axes. This principle is exploited in various designs, such as in the design of various types of polarizing beamsplitters. By way of illustration, FIG. 1B shows an exemplary transmission spectrum of a polarizing beamsplitter formed using thin-film coatings for two orthogonal polarization states. For one polarization state, shown as P-polarization, transmission is very high between wavelengths $\lambda_1$ and $\lambda_2$; for the other, S-polarization, most of the light in this range is reflected. A number of polarizing beamsplitter designs employ this same principle for separating light of different polarization states, over a given wavelength band.

Even where some attempt has been made to control the behavior of the different polarization states in a thin-film filter design, it has proved difficult to provide similar handling of light in S- and P-polarization states. By way of example, FIG. 1C shows the spectral characteristic of a high-performance edge filter having a relatively steep edge. Curves for P-polarized light P and S-polarized light S are shown, along with a curve for polarization-averaged light A, that is, the average of P- and S-polarized light. Transmission is shown from 0 dB (0 OD) to −100 dB (10 OD), over a range of angles of incidence (AOI) from 0 to 20 degrees. A difference curve D, shown as a dashed line and with its scale at the right, indicates the difference between attenuation for S- and P-polarized light at each point. As can be seen from FIG. 1C, this filter design provides nearly equivalent attenuation of both S- and P-polarized light within only a very limited range of angles, in the range from about 2 to 3 degrees. The attenuation then changes dramatically from that point, so that by about 4 degrees, the difference in attenuation as shown in curve D is about −5 dB (0.5 OD). Over an AOI range from greater than 2 to about 9 degrees, polarization-averaged attenuation ranges from 0 OD (0 dB) to 4 OD (−40 dB), as shown by curve A. However, over this same 7 degree angular range, the difference between attenuation to S-polarized light and attenuation to P-polarized light ranges from near 0 dB to about −16 dB (0 OD to 1.6 OD).

This problem in handling S- and P-polarized light differently has long been recognized by those skilled in thin-film filter design. As just one acknowledgement of the inherent problems caused by polarization, researchers Gu and Zheng, in an article entitled "Design of non-polarizing thin film edge filters" in Journal of Zhejiang University SCIENCE A (2006) 7(6) pp. 1037-1040, note the difficulty in dealing with polarization differences in thin-film response and state that "the separation between S- and P-polarization components is an invariable effect in such interference thin film edge filters at non-normal light incidence." In addition, a number of patents and related publications also attest to this apparently inherent, invariable behavior, and some considerable effort has been expended in thin-film component design to try to correct or compensate for differences in handling light components of different polarization states. For example, U.S. Pat. No. 4,373,782 entitled "Non-Polarizing Thin-Film Edge Filter" to Thelen describes different behavior for light having P (parallel) and S (perpendicular) polarization axes and proposes aligning a single edge of an interference bandpass filter, at a fixed incident angle, to achieve similar response for P- and S-polarized light at a single wavelength or over a very narrow band of wavelengths. Other attempts try to address the problem of differences in how light of different polarization axes are handled by adjusting the position of polarization peaks for the different P- and S-polarization states, as described in U.S. Pat. No. 5,926,317 entitled "Multilayer Thin Film Dielectric Bandpass Filter" to Cushing, and in U.S. Patent Application No. 2003/0128432 entitled "Polarization Independent Thin Film Optical Interference Filters" by Cormack et al., for example.

A similar approach to that proposed in the Cushing '317 disclosure, matching polarization response for a single wavelength and fixed angle, is adapted for color separators and combiners by researchers Chen and Gu in an article entitled "Design of non-polarizing color splitting filters used for projection display system" in *Displays* 26 (April 2005) pp. 65-70. However, a combination of high dynamic range, high levels of attenuation, and insensitivity to polarization is not achieved, nor would it be useful with a spectral combiner or separator using such a coating. Notably, what these researchers teach provides neither linear attenuation response over a range of incident angles, nor similar attenuation for both S- and P-polarizations over a range of angles.

It is generally accepted that there is no way to surmount this problem; polarization differences are considered to be simply inherent to devices formed using layers of isotropic thin-film materials. In an article entitled "Nonpolarizing and polarizing filter design" in *Applied Optics,* 20 Apr. 2005, authors Qi et al., note that "changes in phase thicknesses and in optical admittances of the layers are fundamental and cannot be avoided at oblique incidence." These authors also note that, as a result, different reflective and refractive properties are exhibited for the transverse-electric and transverse-magnetic fields of a plane wave in dielectric thin films. Their proposed solution for avoiding polarization-dependence is to use birefringent (i.e., nonisotropic) thin-film designs, which are considerably more difficult to fabricate than their isotropic counterparts.

Inherent differences in how thin-film coatings handle light having orthogonal polarization axes and experience with thin-film coatings in various filter applications offer little promise for non-polarized laser attenuation using these coatings. One example of a proposed solution is given in U.S. Pat. No. 4,778,263 entitled "Variable Laser Attenuator" to Foltyn that describes the use of a matched pair of thin-film interference filters arranged at different angles to provide variable laser attenuation. However, the Foltyn '263 disclosure clearly indicates a high degree of polarization dependence as well as wavelength dependence for an attenuation device formed in this manner, intended for use with unpolarized excimer lasers. Moreover, as is shown in FIG. 8 of the Foltyn '263 disclosure, the average light output is non-linear and may not even be monotonic over a range of incident angles.

Thus, there is a long-felt need for a variable laser attenuator that provides attenuation over a range of values and is polarization-neutral over that range.

SUMMARY OF THE INVENTION

It is an object of the present invention to advance the art of light attenuation. With this object in mind, the present invention provides apparatus and methods for polarization-independent attenuation of incident light using thin-film filters. According to an embodiment of the present invention, there is provided an optical element comprising:
at least one substrate having at least one surface; and
a plurality of layers formed on the at least one surface of the at least one substrate,
the plurality of layers including alternating first and second layers, the first layers having a first refractive index, $n_L$, and the second layers having a second refractive index, $n_H$, greater than the first refractive index, wherein the plurality of layers exhibit a spectral characteristic,
the spectral characteristic providing, for incident light at a predetermined wavelength and directed toward the optical element within a range of incident angles bounded by a first incident angle $\theta_1$ and a second incident angle $\theta_2$, wherein the first and second incident angles $\theta_1$ and $\theta_2$ are between 0 and 80 degrees and wherein the difference between the first and second incident angles $\theta_1$ and $\theta_2$ is at least 1 degree, substantially linear polarization-averaged attenuation of the incident light energy given by:

$$A\theta_n = -\log_{10}((Tp_n + Ts_n)/2)$$

wherein, for any incident angle $\theta_n$ that lies within the range between and including angles $\theta_1$ and $\theta_2$,
$A\theta_n$ is the corresponding polarization-averaged attenuation in terms of optical density,
$Tp_n$ is the transmission, at angle $\theta_n$, of light energy of a first polarization axis, and
$Ts_n$ is the transmission, at angle $\theta_n$, of light energy of a second polarization axis that is orthogonal to the first polarization axis, and
wherein the polarization-averaged attenuation $A\theta_n$ at angle $\theta_1$ is less than or equal to an optical density value of 0.2 and the polarization-averaged attenuation $A\theta_n$ at angle $\theta_2$ exceeds an optical density value of 4.

It is a feature of the present invention that it provides optical attenuation that varies with angle of incidence over a range of angles.

It is an advantage of the present invention that it provides optical polarization-averaged attenuation of laser or other narrow-band light with a single optical element. Embodiments of the present invention do not require birefringent or otherwise non-isotropic film layers, but use conventional isotropic dichroic thin film materials for providing laser light attenuation that is polarization-independent.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

DETAILED DESCRIPTION OF THE INVENTION

Figure 1A:
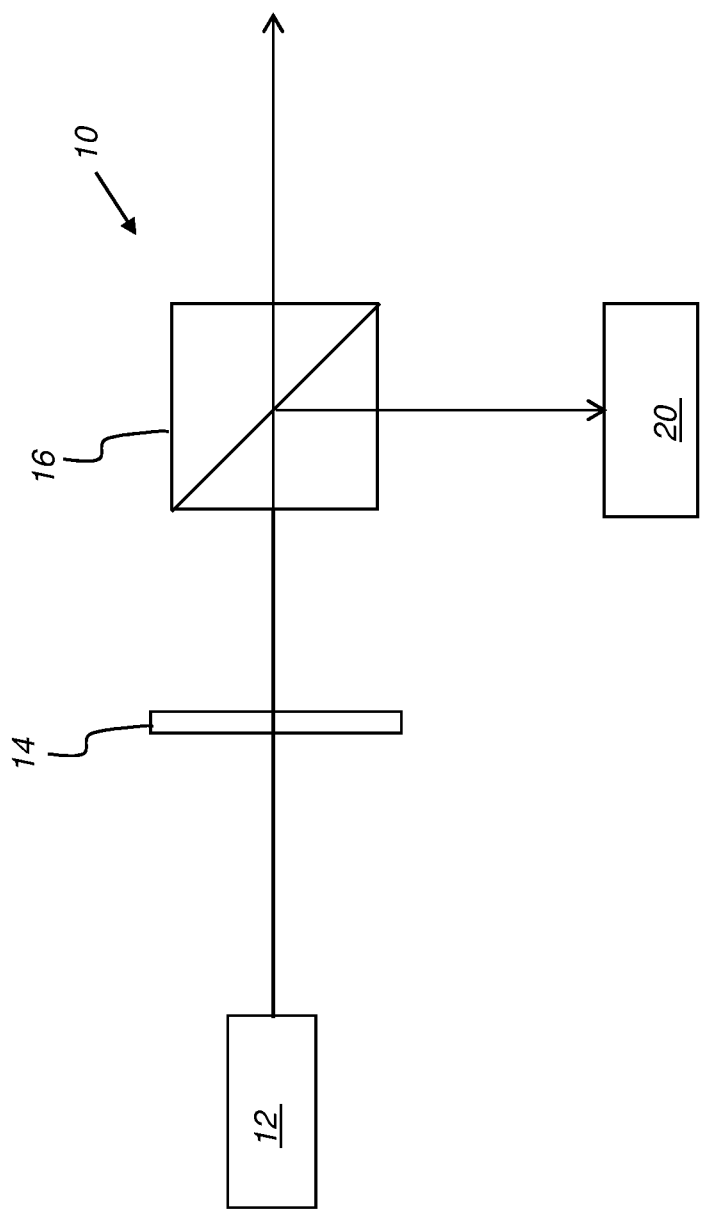
FIG. 1A is a schematic diagram showing a conventional type of laser attenuator using a half wave plate and polarizing beamsplitter.
Figure 1B:
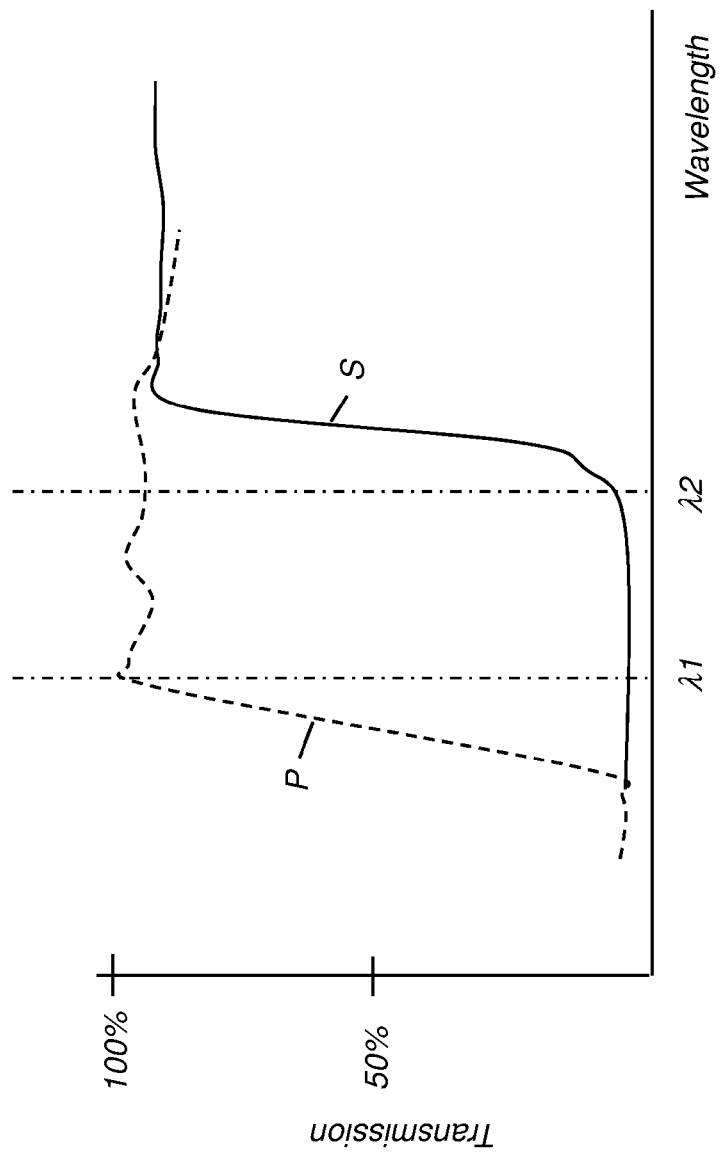
FIG. 1B is a graph showing an exemplary transmission spectrum of a polarizing beamsplitter formed using thin-film coatings for two orthogonal polarization states.

The present description is directed in particular to elements forming part of, or cooperating more directly with, apparatus in accordance with the invention. It is to be understood that elements not specifically shown or described may take various forms well known to those skilled in the art.

Figures shown and described herein are provided in order to illustrate key principles of operation and component relationships along their respective optical paths according to the present invention and are not drawn with intent to show actual size or scale. Some exaggeration may be necessary in order to more clearly emphasize basic structural relationships or principles of operation. Some conventional components that would be needed for implementation of the described embodiments, such as various types of optical mounts and related hardware, for example, are well known and are not shown in the drawings in order to simplify description of the invention itself. In the drawings and text that follow, like components are designated with like reference numerals, and similar descriptions concerning components and arrangement or interaction of components already described are omitted. Where they are used, the terms "first", "second", "third", and so on, do not necessarily denote any ordinal or priority relation, but are simply used to more clearly distinguish one element from another.

As was noted in the background section, multilayer thin film optical elements formed using isotropic layers have been heretofore considered to be poorly suited for use as variable laser light attenuators, due largely to polarization effects. In spite of conventional teaching for thin-film devices, embodiments of the present invention adapt thin-film design to the problem of variable light attenuation and provide a variable light attenuator that provides a high level of attenuation for light of a given wavelength and that is capable of providing variable light attenuation with both polarized and un-polarized light.

Variable Attenuation by Incident Angle

Embodiments of the present invention provide an optical element that presents a variable polarization-averaged attenuation to incident light at a given wavelength according to the angle of incidence of the light beam on the optical element. As shown in the schematic diagram of FIG. 2, the angle of incidence of a light beam from light source 12 to an optical element 30 that provides the attenuation can be varied to any suitable angle θn in a range that is bounded by two angular values, shown as $\theta_1$ and $\theta_2$. The range of angles of incidence can be over some portion of the range from 0 to about 80 degrees, so that incident light can have a normal, near-normal, or non-normal relationship to the surface of optical element 30 at various positions in the angular range. In the context of the present disclosure, an angular relationship is considered to be "non-normal" when not within ±10 degrees of any integer multiple of 90 degrees.

Figure 2:
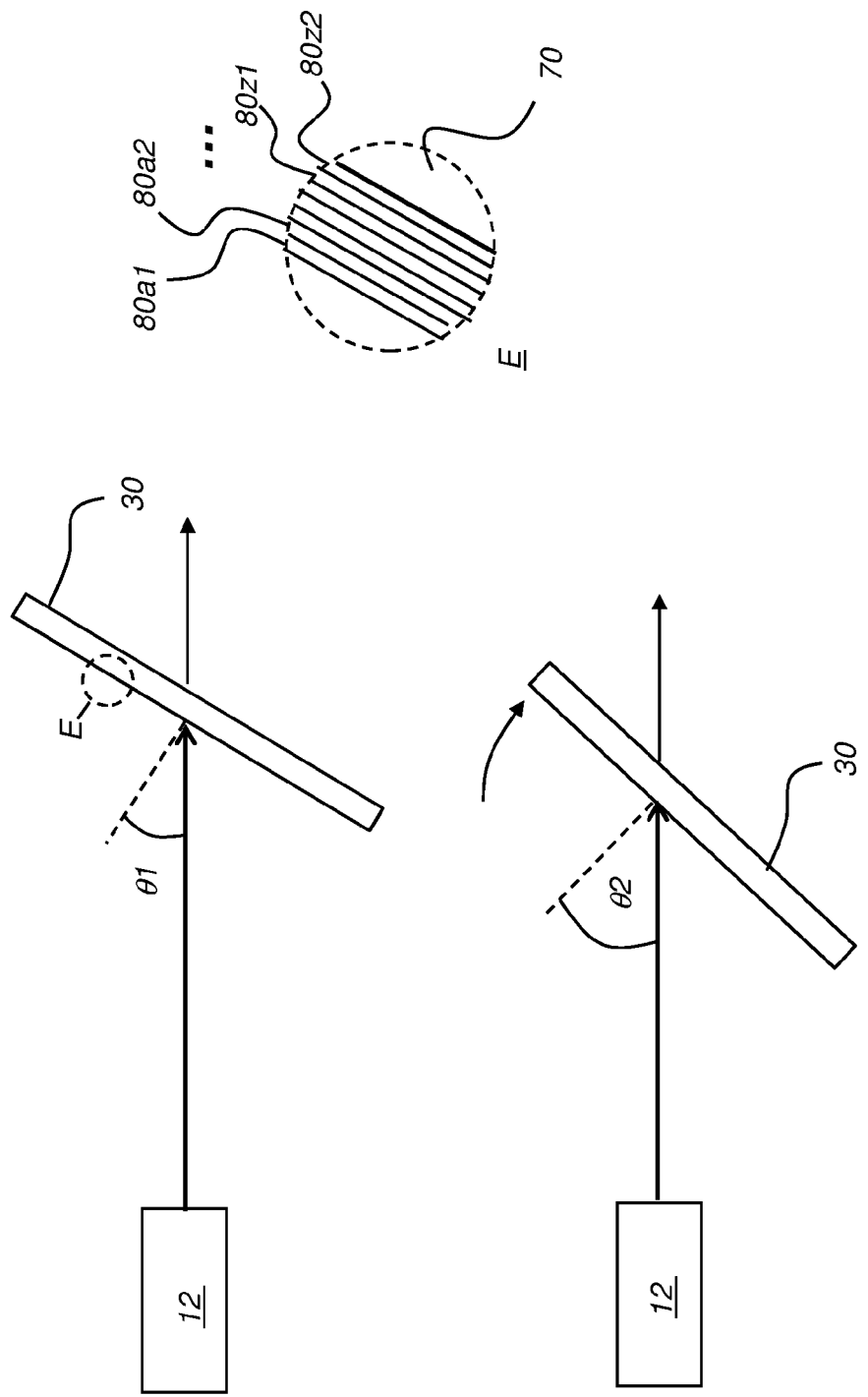
FIG. 2 is a schematic diagram that shows an optical element for light attenuation over a range of incident angles.

The performance of optical element 30 is determined by the design of multiple thin-film layers that provide or exhibit a spectral characteristic. Inset E in FIG. 2 shows layers 80a1, 80a2 . . . 80z1, 80z2, formed on at least one surface of a transparent substrate 70, that provide the spectral characteristic. The layers are formed of transparent isotropic materials with alternating first layers having a first refractive index, $n_L$, and second layers having a second refractive index, $n_H$, greater than the first refractive index, wherein the plurality of layers exhibits a spectral characteristic.

Figure 3:
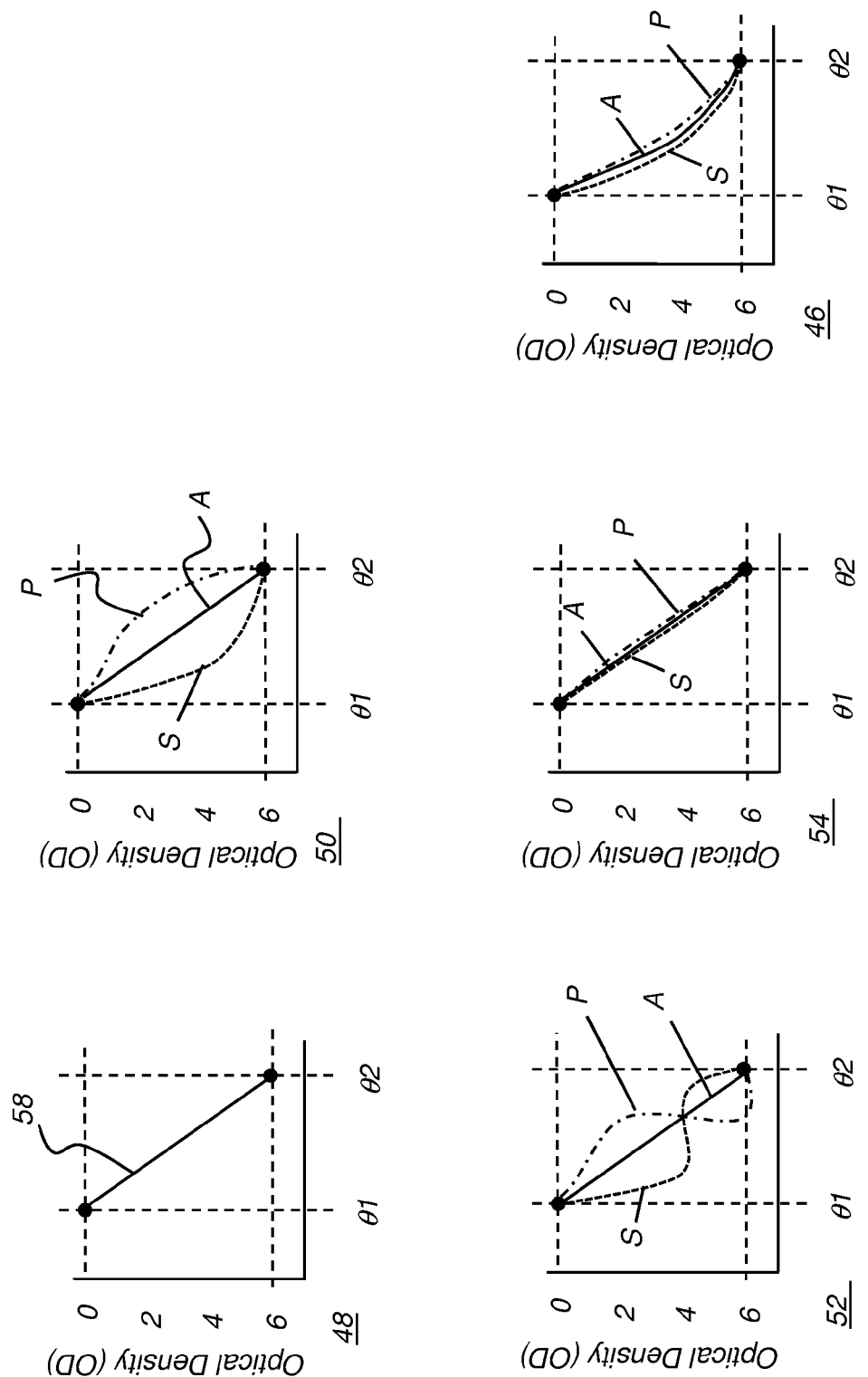
FIG. 3 is a diagram showing graphs of attenuation arrangements for linear attenuation of the average of two orthogonal polarization states.

FIG. 3 shows graphs 46, 48, 50, 52, and 54 of possible attenuation arrangements that can be provided between angles $\theta_1$ and $\theta_2$ as part of the spectral characteristic obtained by the arrangement of layers 80a1, 80a2 . . . 80z1, 80z2. Incident light is at a fixed, predetermined wavelength, depending on the laser or other light source for which the attenuator is designed.

Graph 48 in FIG. 3 shows an attenuation curve 58 that is monotonic and substantially linear, so that a change in incident angle θn causes a proportional change in attenuation, to within some tolerance. Linearity is a monotonic relationship by definition. Each of graphs 50, 52, and 54 show linear attenuation of the incident light energy for the average of S- and P-polarized light components. Graph 48 shows attenuation having a linear or substantially linear relation. Graph 46 shows attenuation that is monotonic, but may or may not be substantially linear, as defined herein.

The attenuation curves 48, 50, 52, and 54 of FIG. 3 provide a monotonic, linear polarization-averaged attenuation characteristic for the incident light energy over a predefined attenuation range, shown here in terms of optical density (OD) from 0 to 6 OD, correspondingly from 0 dB attenuation to −60 dB attenuation. Optical density in OD is defined as $-\log_{10}$(Transmission). Attenuation in dB is defined as 10× $\log_{10}$(Transmission). Transmission is assumed to vary between 0 (no transmission) and 1 (100% transmission). It should be noted that attenuation is expressed as a positive number in OD, but often graphed with opposite slope as shown in FIG. 3. Attenuation in dB is expressed as a negative value.

In the particular relationship shown in these example graphs, an increase in angle θn within the range causes an increase in attenuation; the slope of the attenuation curve could alternately be in the opposite direction, with attenuation at a lower value as angle $\theta_n$ increases.

Each of graphs 48, 50, 52, 54, and 46 show monotonic attenuation of the incident light energy for the average of S- and P-polarized light components given by:

$$A\theta_n = -\log_{10}((Tp_n + Ts_n)/2) \qquad (1)$$

wherein, for any incident angle $\theta_n$ that lies within the range between and including angles $\theta_1$ and $\theta_2$, $A\theta_n$ is the corresponding polarization-averaged attenuation;

$Tp_n$ is the transmission of light energy at angle $\theta_n$ of a first polarization axis, such as P-polarized light; and $Ts_n$ is the transmission of light energy at angle $\theta_n$ of a second polarization axis that is orthogonal to the first polarization axis.

In graph 50, curves S and P for the S-polarized light and P-polarized light also show monotonic behavior over the interval between incident angles $\theta_1$ and $\theta_2$. In graph 52, neither the attenuation curve S for S-polarized light nor the attenuation curve P for P-polarized light are monotonic over the range between incident angles $\theta_1$ and $\theta_2$; however, their average attenuation A is monotonic and substantially linear. In graph 54, both the attenuation curve for P-polarized light component, P, and the attenuation curve for S-polarized light component, S, are monotonic over the range between incident angles $\theta_1$ and $\theta_2$; and substantially linear, as defined herein, as well as close together in value over the range. In graph 46, both the attenuation curve for P-polarized light component, P, and the attenuation curve for S-polarized light component, S, are monotonic over the range between incident angles $\theta_1$ and $\theta_2$, as well as close together in value over the range, despite the fact that the polarized-averaged attenuation may not be substantially linear. For example, at any angle $\theta_n$ in the range, the difference between attenuation values $Ap_n$ and $As_n$ for S- and P-polarized light is less than or equal to 0.1 OD (1 dB), preferably less than 0.02 OD (0.2 dB), more preferably less than 0.01 OD (0.1 dB).

In the context of the present disclosure, the term "linear" relates to the relationship between two related values and to how one value changes with respect to another. First and second values are related in a linear manner when there is a proportional relationship between them that is substantially fixed. Values that are proportional change in a fixed ratio, so that an amount of change to the first variable determines a proportional amount of change to the second variable.

The slope of linear attenuation can be positive or negative in different embodiments of the present invention. For consistency in the context of the present disclosure, the angle $\theta_2$ is defined as the angle at which attenuation is greater; the angle $\theta_1$ is the angle at which attenuation is near zero. Thus, in an embodiment of the present invention, angle $\theta_2$ may be greater than or less than $\theta_1$, depending on the spectral characteristic that is provided by a particular filter design. Using this definition, in the context of the present disclosure, "substantially linear attenuation" is defined relative to the proportion (slope) m that is defined by:

$$m = \frac{A\theta_2}{\theta_2 - \theta_1} \quad (2a)$$

wherein $A\theta_2$ is the actual polarization-averaged attenuation value at $\theta_2$, expressed in OD. The actual attenuation value at $\theta_1$, $A\theta_1$, is zero or very near zero, to at least within the range:

$$A\theta_1 \leq 0.2 \text{ OD} \quad (2b)$$

Preferably, the attenuation value $A\theta_1$ is even closer to zero, such as:

$$A\theta_1 \leq 0.1 \text{ OD} \quad (2c)$$

Perfectly linear attenuation at angle $\theta_n$ is taken to be $$A\theta_{n,linear} = m(\theta_n - \theta_1) \quad (2d)$$

wherein by definition the attenuation is taken to be exactly 0 at $\theta_1$. The actual measured polarization-averaged attenuation value, in OD, is considered to be substantially linearly related when it satisfies, at every angle $\theta_n$ in the range:

$$-0.02 \text{ OD} \leq A\theta_n - A\theta_{n,linear} \leq +0.02 \text{ OD},$$

or, explicitly, $$-0.02 \text{ OD} \leq A\theta_n - m(\theta_n - \theta_1) \leq +0.02 \text{ OD} \quad (3)$$

Figure 1C:
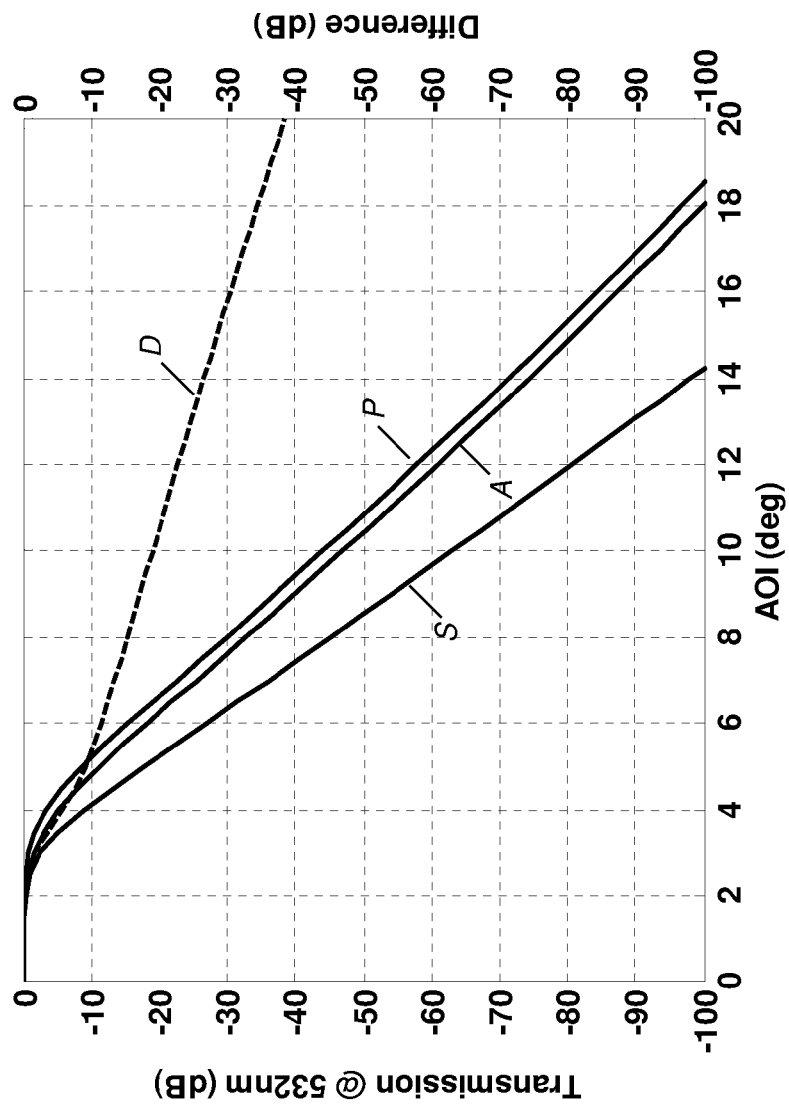
FIG. 1C is a graph that shows characteristic attenuation that can be achieved using a conventional edge filter formed from multi-layer thin film coatings.

Thus, for example, the exemplary edge filter whose spectral characteristic is shown in FIG. 1C does not exhibit substantially linear polarization-averaged attenuation over the range from 0 OD to 4 OD, as defined herein. To show this for the example of FIG. 1C, observe that the polarization-averaged attenuation value $A\theta_1$ at approximately 0 degrees, is $A\theta_1 = 0$ OD. The polarization-averaged attenuation value $A\theta_2$ at 9 degrees is $A\theta_2 = 4$ OD. Using equation (2a) above, this yields the slope $$m = \frac{4}{9-0} = 0.444$$

Then, consider a value $\theta_n$ within the range; for example where $\theta_n = 6$ degrees, $A\theta_n = 1.9$ OD. To use (3), compute:

$$A\theta_n - m(\theta_n - \theta_1) = 1.9 - 0.444(6-0) = -0.764 \text{ OD}$$

This shows that relation (3) is not properly met for all angles $\theta_n$ within the range defined by $\theta_1$ and $\theta_2$ by the spectral characteristic of the edge filter given in FIG. 1C.

Thus, for example, polarization-averaged curve A in graph 46 of FIG. 3 may be substantially linear provided each value $A\theta_n$ on the curve meets these criteria. This same relationship in (2a-d) and (3), with the necessary changes of terms, also defines whether or not individual attenuation curves for P-polarized and S-polarized light, labeled S and P respectively, can be considered to be substantially linear.

Figure 4:
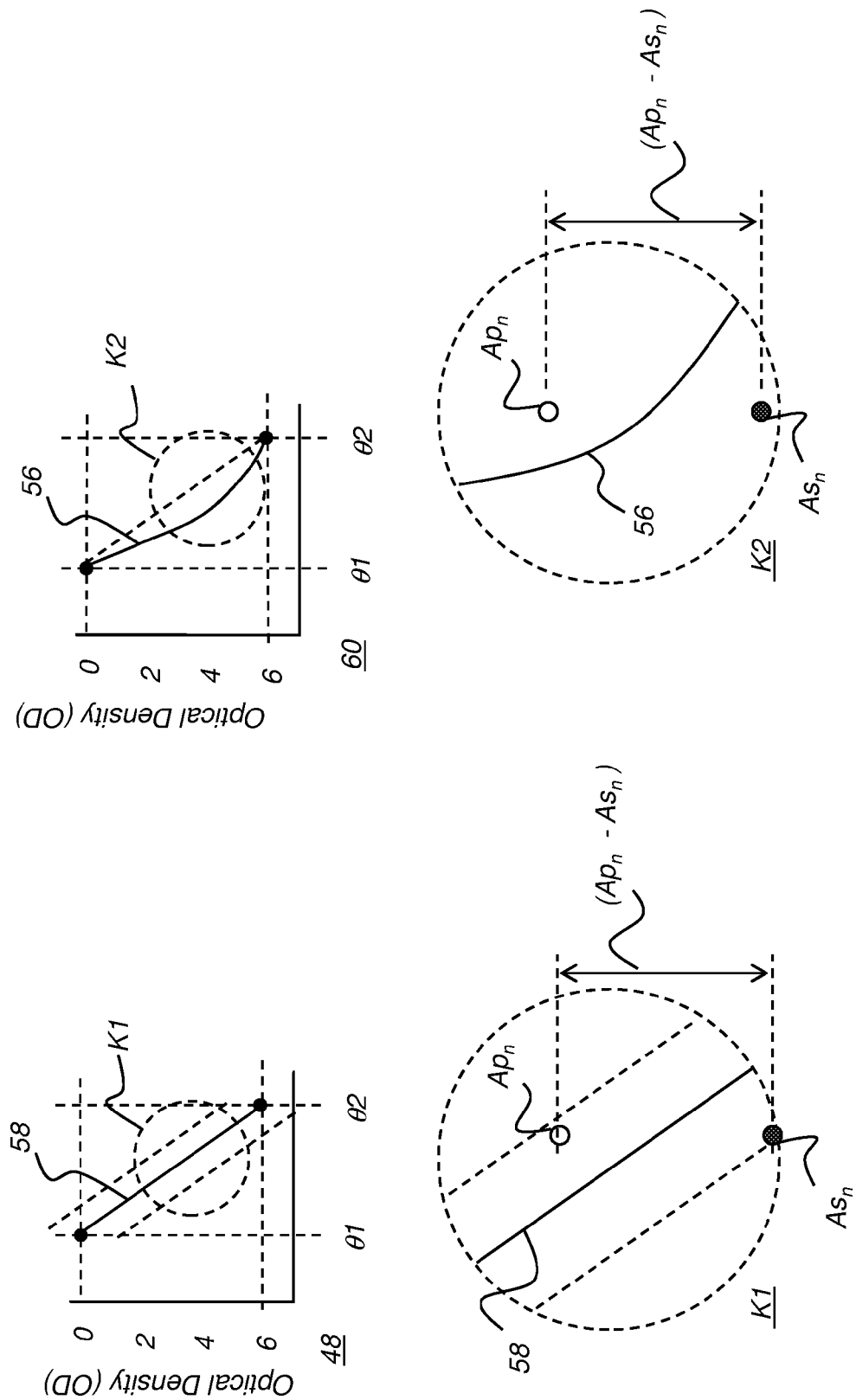
FIG. 4 is a diagram showing graphs of attenuation of the average of two orthogonal polarization states and of the S- and P-polarized components.

In addition to linearity, attenuator embodiments of the present invention also provide polarization insensitivity wherein the S-polarized light and P-polarized light are closely matched over a range of angles, with their respective attenuation values differing from each other at any angle $\theta_n$ by not more than about 0.1 OD, which can be stated:

$$-0.1 \text{ OD} \leq Ap_n - As_n \leq +0.1 \text{ OD} \quad (4)$$

for any angle $\theta_n$ between $\theta_1$ and $\theta_2$. Preferably, $Ap_n$ and $As_n$ differ from each other by no more than about 0.02 OD. More preferably, values $Ap_n$ and $As_n$ differ from each other by no more than about 0.01 OD. This close-match relationship is shown in FIG. 4. An inset K1 shows this proximity of S- and P-attenuation values for a linear average curve 58. For a graph 60, another inset K2 shows this proximity of values for a monotonic average curve 56.

Figure 5:
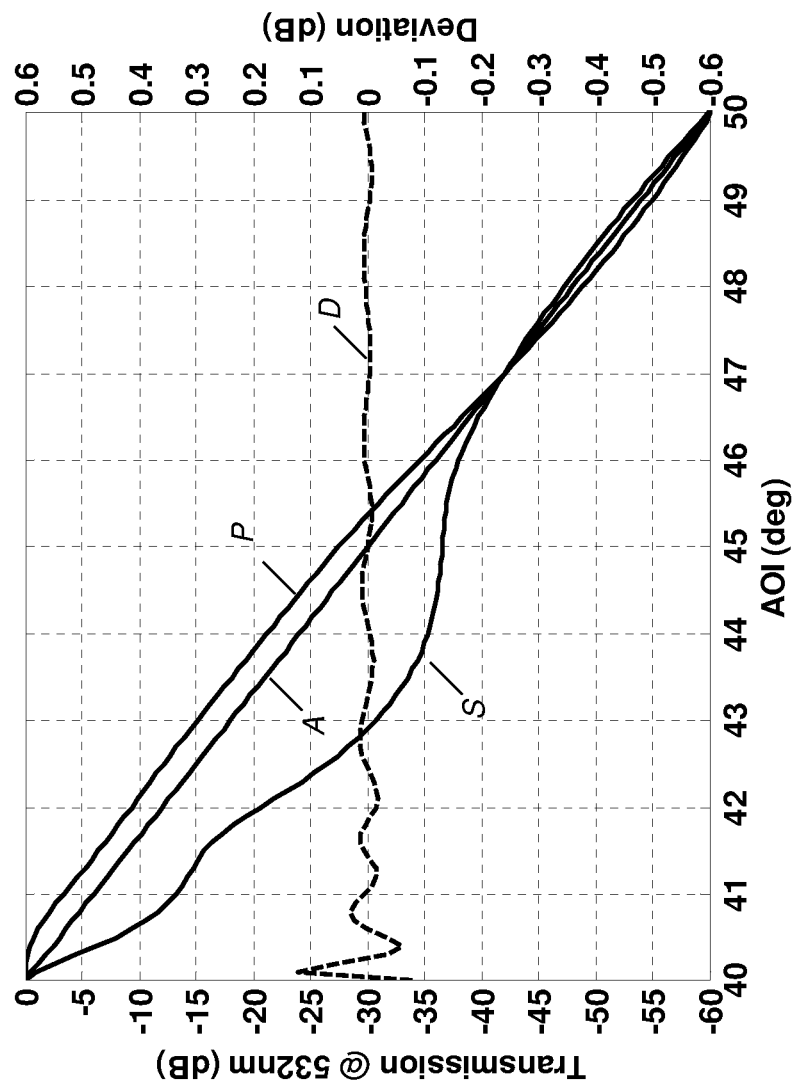
FIG. 5 is a graph that shows the spectral characteristic for a variable attenuator in an embodiment of the present invention for incident light of a given wavelength.

The graph of FIG. 5 shows the spectral characteristic for a variable attenuator in an embodiment of the present invention for light of a given wavelength of 532 nm, wherein the range of angles is defined about a central angle of approximately 45 degrees. The attenuation curve for average polarization, A, is substantially linear over the range of angles of incidence (AOI) from 40 to 50 degrees, with attenuation ranging from 0 OD (equivalent to 0 dB) to 6 OD (equivalent to −60 dB). The individual attenuation curves for the P-polarized light component, P, and for the S-polarized light component, S, are not linear in this embodiment. Also plotted in FIG. 5 is a difference curve D that indicates the difference, in dB, between the actual polarization-averaged attenuation curve and the idealized, perfectly linear attenuation curve varying from OD 0 to 6 over the angular range 40 to 50 degrees. Table 1 lists the layer components used to provide the spectral characteristic shown in FIG. 5.

Figure 6A:
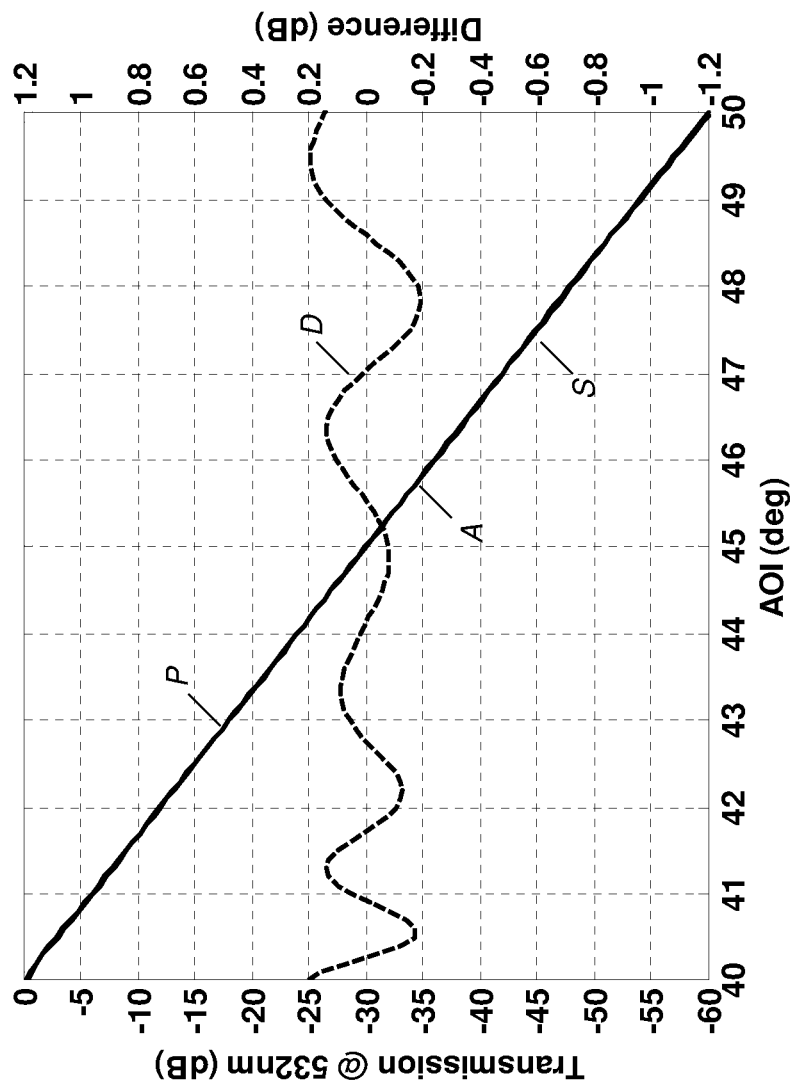
FIG. 6A is a graph that shows a spectral characteristic for a highly linear embodiment, in which both of the respective attenuation curves for S- and P-polarized light are linear over the given incident angle range.
Figure 6B:
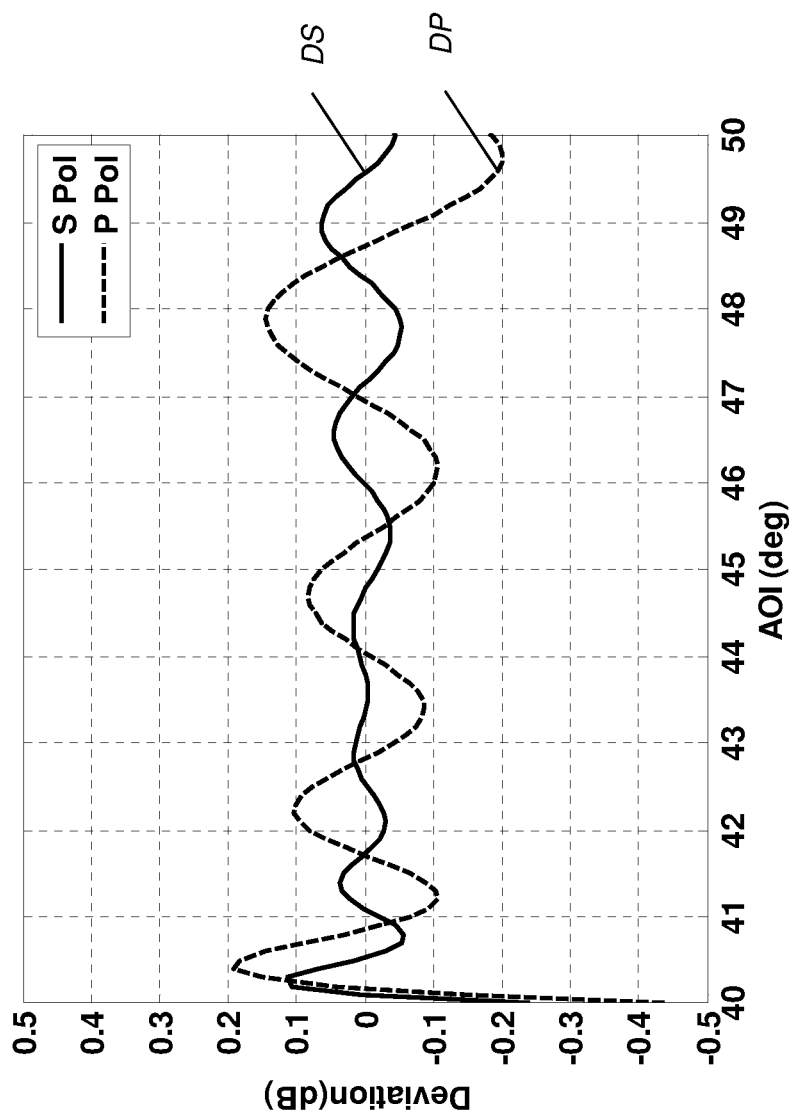
FIG. 6B is a graph that shows deviation from linear attenuation for S- and P-polarized light on an enlarged scale for the embodiment shown in FIG. 6A.

The graph of FIG. 6A shows a spectral characteristic for a highly linear embodiment, in which both of the respective attenuation curves for S- and P-polarized light are linear over the given AOI range. Again, the difference curve D shows the difference, in dB, between an actual polarization-averaged attenuation curve and an idealized, perfectly linear attenuation curve varying from OD 0 to 6 over the angular range 40 to 50 degrees. The graph of FIG. 6B shows deviation from linear with deviation curves DS and DP for S- and P-polarized light respectively, on an enlarged scale. As can be seen, the deviation over the angular range is within ±0.2 dB (±0.02

OD), indicating substantial linearity. Table 2 lists the layer components used to provide the spectral characteristic shown in FIGS. 6A and 6B.

Figure 7A:
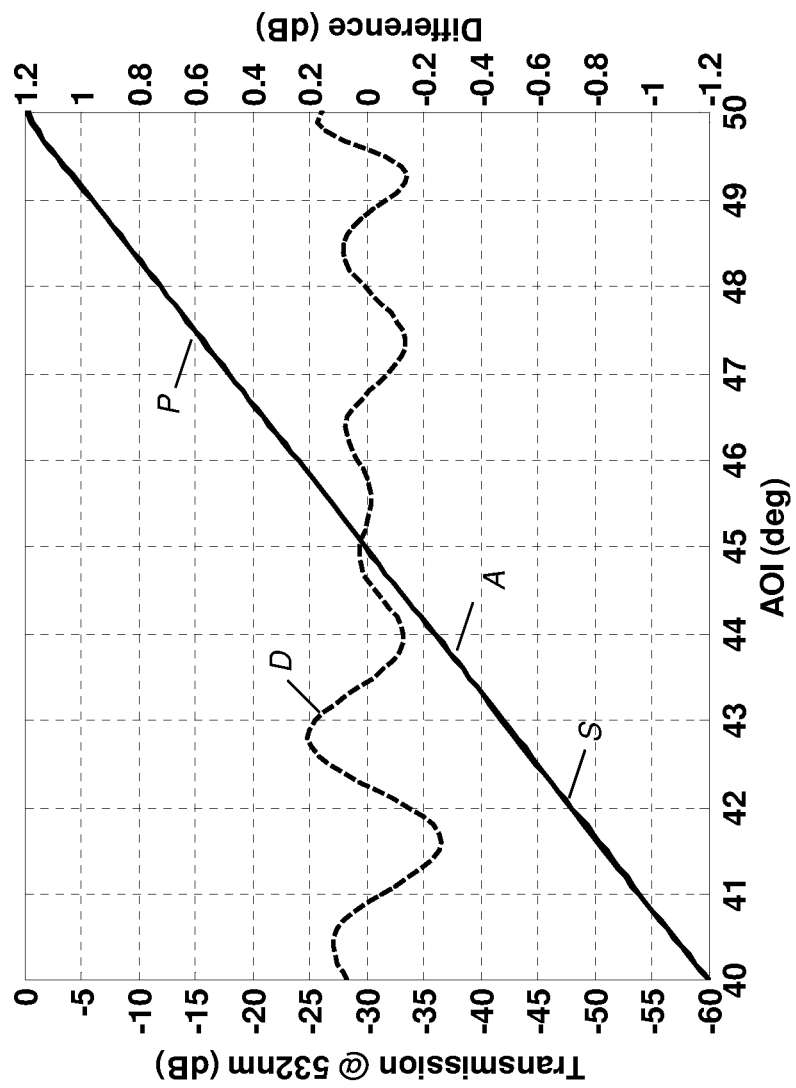
FIG. 7A is a graph that shows a spectral characteristic for another highly linear embodiment, in which both of the respective attenuation curves for S- and P-polarized light are linear with positive slope over the given incident angle range.
Figure 7B:
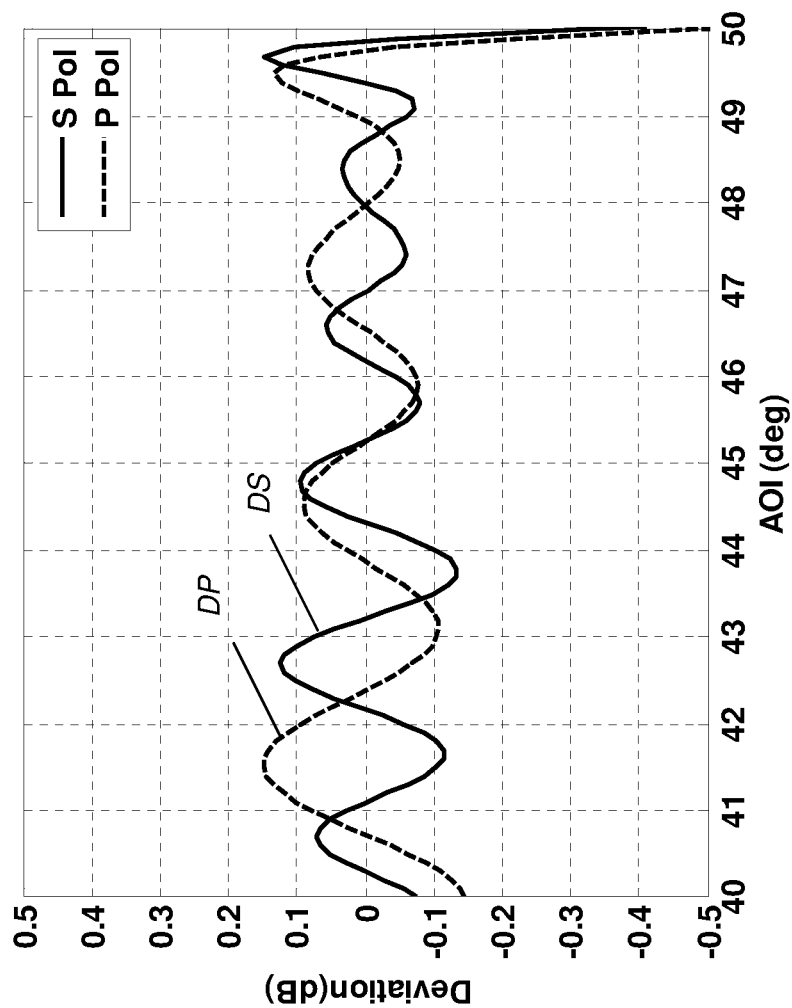
FIG. 7B is a graph that shows deviation curves for S- and P-polarized light respectively, showing, on an enlarged scale, deviation from linear for the embodiment shown in FIG. 7A.

The graph of FIG. 7A shows a spectral characteristic exhibited for a highly linear embodiment with opposite slope from that shown in FIG. 6A, in which again both of the respective attenuation curves for S- and P-polarized light are linear over the given AOI range. Again, the difference curve D shows the difference, in dB, between the actual polarization-averaged attenuation curve and the idealized, perfectly linear attenuation curve varying from OD 6 to 0 over the angular range 40 to 50 degrees. The graph of FIG. 7B shows deviation curves DS and DP for S- and P-polarized light respectively, on an enlarged scale. As can be seen from FIG. 7A, the difference over the range is within about ±0.3 dB (±0.03 OD), with substantial linearity of the average curve. Deviation from linear, shown in FIG. 7B, is within ±0.2 dB (±0.02 OD) for each individual S and P light component. Table 3 lists the layer components used to provide the spectral characteristic shown in FIGS. 7A and 7B.

Significantly, embodiments of the present invention provide a spectral characteristic that provides attenuation of 4 OD (−40 dB) or better for a variable optical attenuator at angles of incidence over a range of 1 degree or more. For even greater performance, embodiments of the present invention provide a spectral characteristic with attenuation of up to 6 OD (−60 dB) for a variable optical attenuator at angles of incidence over a range of up to 1 degree or greater.

Figure 8:
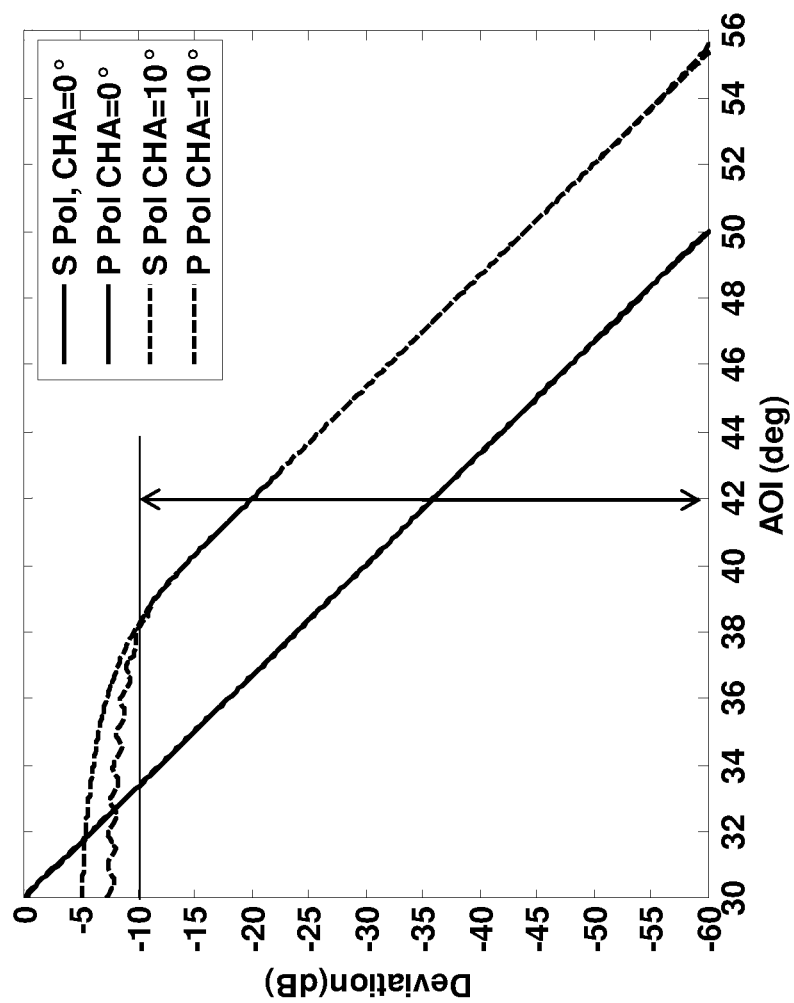
FIG. 8 shows spectral characteristics for light having different cone half-angles according to an embodiment of the present invention.

One consideration for a variable attenuator with the advantageous polarization-handling characteristics of embodiments of the present invention relates to the angular range of the incident light beam. The graph of FIG. 8 shows how the spectral characteristic of the thin-film attenuator of embodiments of the present invention provides a similar spectral characteristic for light having successively larger cone half-angles (CHA). FIG. 8 shows spectral characteristic performance for light having 10 degree CHA. Table 4 lists the layer components used to provide the spectral characteristic shown in FIG. 8.

Figure 9:
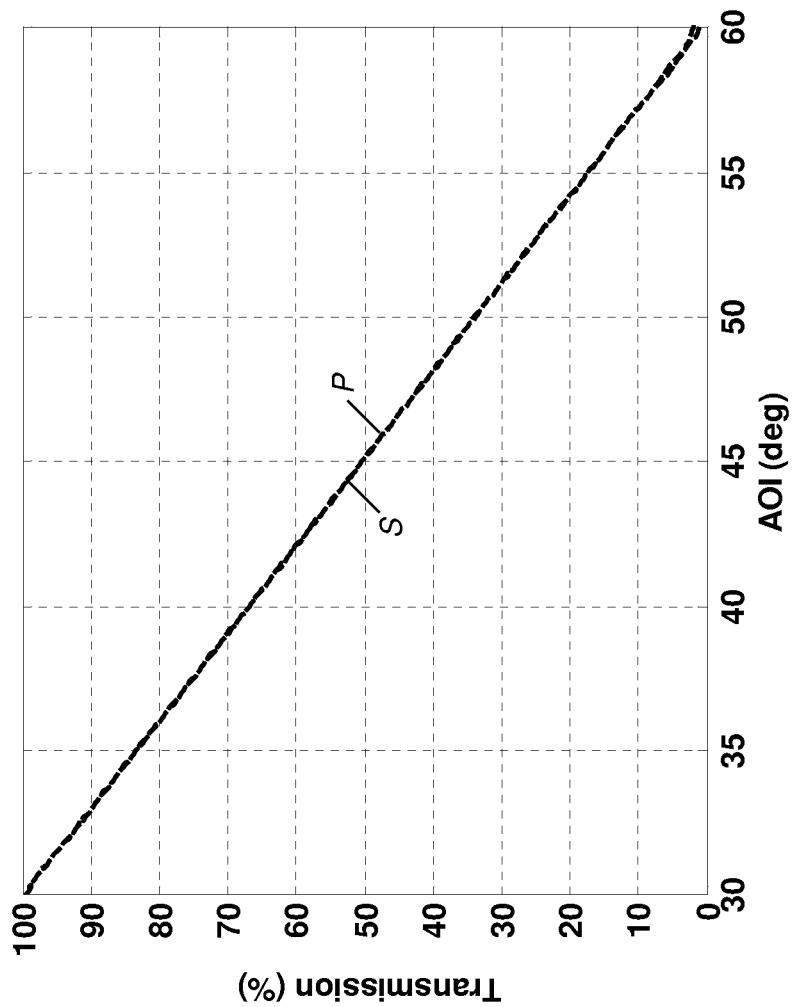
FIG. 9 is a spectral characteristic of a variable attenuator having a linear response over a range of angles, with percent transmission shown.

The graph of FIG. 9 shows an embodiment having linear transmission (in percentage) over a broad range of angles of incidence. Table 5 lists the layer components used to provide the spectral characteristic shown in FIG. 9.

Thin-Film Arrangements

Exemplary filters consistent with the invention and having the characteristics illustrated in FIGS. 5-9 may be produced by depositing hard coating filter layers using a timing technique and an ion-assisted, ion-beam sputtering vacuum system. The filters may be deposited on a Schott OG-570 glass substrate, the low-index material may be silicon dioxide (SiO2, index of about 1.5), and the high-index material may be tantalum pentoxide (Ta2O5, index of about 2.1).

The layer structure for the variable attenuator with the spectral characteristic of FIG. 5 is provided subsequently in Table 1.

The layer structure for the variable attenuator with the spectral characteristic of FIGS. 6A and 6B is provided subsequently in Table 2.

The layer structure for the variable attenuator with the spectral characteristic of FIGS. 7A and 7B is provided subsequently in Table 3.

The layer structure for the variable attenuator with the spectral characteristic of FIG. 8 is provided subsequently in Table 4.

The layer structure for the variable attenuator with the spectral characteristic of FIG. 9 is provided subsequently in Table 5.

Fabrication Methods

Multilayer thin-film attenuators of the present invention use optically isotropic coatings of metal oxides that are physically hard ("hard coatings") and provide a glass-like surface, as opposed to optical coatings of softer materials, such as sodium aluminum fluoride ("cryolite") and/or zinc sulfide ("soft coatings"). For example, filters including soft coatings are commercially available from Omega Optical, Inc.

In a preferred embodiment, the hard coating layers are deposited using ion-assisted ion beam sputtering. In order to reproducibly make filters with hard coating layers, given that the deposition rate in most deposition systems may vary with time, it is useful to use an optical monitoring technique. For example, commonly assigned U.S. Pat. No. 7,068,430 to Clarke et al., incorporated herein by reference, discusses optical monitoring methods which can be used to make the inventive filters. However, in ion-beam sputtering systems the deposition rate can be remarkably stable, and therefore when such a machine is running well, the hard coating layers may be deposited by calculating the thickness desired for each layer, assuming a deposition rate for each material, and then using the resulting deposition time to determine when to cut each layer (a "timing" technique). Those skilled in the art will recognize, however, that other deposition systems, such as ion-assisted electron beam evaporation and magnetron sputtering, may be used to deposit the layers. Also, a variety of "hard coating" materials that may be used as the high and low index of refraction layers will also be known to those skilled in the art. Exemplary hard coating materials include: $SiO_2$ (refractive index 1.5); $TiO_2$ (refractive index 2.4); $Ta_2O_5$ (refractive index 2.1); $Nb_2O_5$ (refractive index 2.2); $HfO_2$ (refractive index about 2.0); and $Al_2O_5$.

It is to be understood that the terms "high index of refraction" and "low index of refraction" are used herein to indicate a relative difference between the two layers of material (high and low), and, do not necessarily indicate a particular range of indexes. Thus, each high index of refraction layer need only have an index of refraction which is numerically higher than the low index of refraction layer adjacent thereto. The numerical differences between the index of refraction in the high and low index of refraction materials affects the number of layers required for forming a filter with a particular transmittance characteristic. Generally, a small difference between the indices of refraction in the high and low index materials requires a higher number of alternating layers to achieve a particular transmittance (or optical density) than would be required with a larger difference.

Each of the layers shown as $80a1$, $80a2$ ... $80z1$, $80z2$ in FIG. 2 has an associated optical thickness, defined by the product of its physical thickness times its refractive index. Although the embodiments shown in the drawings are not drawn to scale, the hard coating layers illustrated in FIG. 2 may be, for example, one quarter wavelength in optical thickness. Depending on desired transmission characteristics, however, non-quarter-wave optical thicknesses and/or varying optical thicknesses may also be provided. Layers may be provided on one or both surfaces of the substrate. One surface of the substrate may have an additional anti-reflection coating.

Earlier multilayer surface designs may have spectral characteristics wherein the averaged transmission of light is monotonic or linear over a very narrow range of wavelengths and incident angles, and wherein the attenuation provided to light may not be variable by more than 2 OD over that narrow angular range. By contrast, the spectral characteristic of embodiments of the present invention provide monotonic and substantially linear attenuation in excess of 2 OD over an angular range as high as ±5 degrees or more from a central angle. This angular spread, with monotonic and linear attenuation, is advantageous because it allows attenuation to be easily adjusted with rotation of a surface on an axis orthogonal to the incident beam. Furthermore, a larger angular range to achieve a given range of attenuation (i.e., smaller slope m in Equation 2a), enables a beam of light with less collimation (larger cone-half-angle) to pass through the attenuator with minimal attenuation at one end of the angular range, while maintaining polarization-neutral and substantially linear attenuation over the predominant portion of the dynamic range. Linear attenuation over a range of angles can be particularly useful where it is desirable to change beam intensity in a controlled way, over time.

As is known to those skilled in the thin-film coating arts, there is a correspondence between change in incident angle and shift in wavelength. This allows a multilayer thin-film design of a variable attenuator, designed for a target wavelength, to be readily adaptable and usable with light of nearby wavelengths.

Embodiments of the present invention are suited for attenuation of laser light or other narrow-beam light having a specified wavelength or narrow range of wavelengths. The optical element of the present invention can be used with polarized as well as non-polarized or randomly polarized light. The optical element of the present invention can be fixtured to rotate over a range of incident angles under automatic or manual control.

Thus, what is provided is an apparatus and method for providing a variable multilayer thin film attenuator.

Tables

TABLE 1

FIG. 5 Layer Arrangement
Coating Thickness (μm): 8.332
Nb2O5 (μm): 2.644
SiO2 (μm): 5.688
Total Layers: 110

| Layer | Material | Thickness (nm) |
|---|---|---|
| 1 | Nb2O5 | 59.1 |
| 2 | SiO2 | 98.0 |
| 3 | Nb2O5 | 54.5 |
| 4 | SiO2 | 90.2 |
| 5 | Nb2O5 | 48.2 |
| 6 | SiO2 | 67.4 |
| 7 | Nb2O5 | 43.8 |
| 8 | SiO2 | 66.3 |
| 9 | Nb2O5 | 48.0 |
| 10 | SiO2 | 83.9 |
| 11 | Nb2O5 | 55.2 |
| 12 | SiO2 | 97.6 |
| 13 | Nb2O5 | 58.7 |
| 14 | SiO2 | 103.4 |
| 15 | Nb2O5 | 60.4 |
| 16 | SiO2 | 97.2 |
| 17 | Nb2O5 | 59.5 |
| 18 | SiO2 | 82.1 |
| 19 | Nb2O5 | 46.9 |
| 20 | SiO2 | 62.9 |
| 21 | Nb2O5 | 38.1 |
| 22 | SiO2 | 75.5 |
| 23 | Nb2O5 | 49.9 |
| 24 | SiO2 | 95.3 |
| 25 | Nb2O5 | 57.9 |
| 26 | SiO2 | 104.6 |
| 27 | Nb2O5 | 59.3 |
| 28 | SiO2 | 108.5 |
| 29 | Nb2O5 | 58.0 |
| 30 | SiO2 | 110.8 |
| 31 | Nb2O5 | 56.9 |
| 32 | SiO2 | 113.1 |
| 33 | Nb2O5 | 51.6 |
| 34 | SiO2 | 103.6 |
| 35 | Nb2O5 | 31.3 |
| 36 | SiO2 | 65.5 |
| 37 | Nb2O5 | 29.5 |
| 38 | SiO2 | 99.6 |
| 39 | Nb2O5 | 53.5 |
| 40 | SiO2 | 107.6 |
| 41 | Nb2O5 | 58.9 |
| 42 | SiO2 | 109.0 |
| 43 | Nb2O5 | 58.3 |
| 44 | SiO2 | 110.1 |
| 45 | Nb2O5 | 58.5 |
| 46 | SiO2 | 111.2 |
| 47 | Nb2O5 | 57.6 |
| 48 | SiO2 | 113.5 |
| 49 | Nb2O5 | 56.8 |
| 50 | SiO2 | 118.4 |
| 51 | Nb2O5 | 51.8 |
| 52 | SiO2 | 138.7 |
| 53 | Nb2O5 | 25.8 |
| 54 | SiO2 | 74.1 |
| 55 | Nb2O5 | 1.9 |
| 56 | SiO2 | 146.2 |
| 57 | Nb2O5 | 44.2 |
| 58 | SiO2 | 117.5 |
| 59 | Nb2O5 | 53.9 |
| 60 | SiO2 | 114.1 |
| 61 | Nb2O5 | 55.7 |
| 62 | SiO2 | 110.2 |
| 63 | Nb2O5 | 56.0 |
| 64 | SiO2 | 109.0 |
| 65 | Nb2O5 | 56.4 |
| 66 | SiO2 | 107.5 |
| 67 | Nb2O5 | 52.2 |
| 68 | SiO2 | 97.5 |
| 69 | Nb2O5 | 37.3 |
| 70 | SiO2 | 71.3 |
| 71 | Nb2O5 | 33.4 |
| 72 | SiO2 | 90.9 |
| 73 | Nb2O5 | 49.9 |
| 74 | SiO2 | 103.9 |
| 75 | Nb2O5 | 59.7 |
| 76 | SiO2 | 106.3 |
| 77 | Nb2O5 | 58.7 |
| 78 | SiO2 | 108.6 |
| 79 | Nb2O5 | 52.0 |
| 80 | SiO2 | 95.3 |
| 81 | Nb2O5 | 43.1 |
| 82 | SiO2 | 69.1 |
| 83 | Nb2O5 | 35.8 |
| 84 | SiO2 | 77.4 |
| 85 | Nb2O5 | 47.1 |
| 86 | SiO2 | 100.2 |
| 87 | Nb2O5 | 56.1 |
| 88 | SiO2 | 103.3 |
| 89 | Nb2O5 | 59.2 |
| 90 | SiO2 | 105.7 |
| 91 | Nb2O5 | 54.6 |
| 92 | SiO2 | 108.6 |
| 93 | Nb2O5 | 31.2 |
| 94 | SiO2 | 82.8 |
| 95 | Nb2O5 | 22.3 |
| 96 | SiO2 | 109.2 |
| 97 | Nb2O5 | 47.7 |
| 98 | SiO2 | 108.6 |
| 99 | Nb2O5 | 59.0 |
| 100 | SiO2 | 101.0 |
| 101 | Nb2O5 | 60.8 |

TABLE 1-continued

FIG. 5 Layer Arrangement
Coating Thickness (μm): 8.332
Nb2O5 (μm): 2.644
SiO2 (μm): 5.688
Total Layers: 110

| Layer | Material | Thickness (nm) |
|---|---|---|
| 102 | SiO2 | 86.3 |
| 103 | Nb2O5 | 46.6 |
| 104 | SiO2 | 59.2 |
| 105 | Nb2O5 | 1.7 |
| 106 | SiO2 | 194.6 |
| 107 | Nb2O5 | 19.9 |
| 108 | SiO2 | 120.8 |
| 109 | Nb2O5 | 59.3 |
| 110 | SiO2 | 274.7 |

TABLE 2

FIG. 6A/6B Layer Arrangement
Coating Thickness (μm): 9.275
Nb2O5 (μm): 3.175
SiO2 (μm): 6.099
Total Layers: 118

| Layer | Material | Thickness (nm) |
|---|---|---|
| 1 | Nb2O5 | 57.70035 |
| 2 | SiO2 | 90.5859 |
| 3 | Nb2O5 | 48.87371 |
| 4 | SiO2 | 64.49805 |
| 5 | Nb2O5 | 161.5009 |
| 6 | SiO2 | 64.70093 |
| 7 | Nb2O5 | 48.22371 |
| 8 | SiO2 | 89.58865 |
| 9 | Nb2O5 | 57.16394 |
| 10 | SiO2 | 101.9997 |
| 11 | Nb2O5 | 56.42101 |
| 12 | SiO2 | 105.5099 |
| 13 | Nb2O5 | 50.50218 |
| 14 | SiO2 | 93.65918 |
| 15 | Nb2O5 | 25.03022 |
| 16 | SiO2 | 80.55084 |
| 17 | Nb2O5 | 36.74455 |
| 18 | SiO2 | 99.71027 |
| 19 | Nb2O5 | 51.46165 |
| 20 | SiO2 | 121.0438 |
| 21 | Nb2O5 | 57.30858 |
| 22 | SiO2 | 111.2526 |
| 23 | Nb2O5 | 56.98762 |
| 24 | SiO2 | 101.2778 |
| 25 | Nb2O5 | 54.40687 |
| 26 | SiO2 | 82.7682 |
| 27 | Nb2O5 | 39.01113 |
| 28 | SiO2 | 60.75344 |
| 29 | Nb2O5 | 39.71163 |
| 30 | SiO2 | 85.46865 |
| 31 | Nb2O5 | 54.73308 |
| 32 | SiO2 | 101.9909 |
| 33 | Nb2O5 | 59.89734 |
| 34 | SiO2 | 107.2912 |
| 35 | Nb2O5 | 59.09109 |
| 36 | SiO2 | 108.8334 |
| 37 | Nb2O5 | 59.99157 |
| 38 | SiO2 | 108.6467 |
| 39 | Nb2O5 | 56.04696 |
| 40 | SiO2 | 102.9672 |
| 41 | Nb2O5 | 47.60399 |
| 42 | SiO2 | 72.93378 |
| 43 | Nb2O5 | 29.59962 |
| 44 | SiO2 | 70.52065 |
| 45 | Nb2O5 | 46.06779 |
| 46 | SiO2 | 102.1195 |
| 47 | Nb2O5 | 55.28625 |
| 48 | SiO2 | 113.2163 |
| 49 | Nb2O5 | 57.57183 |

TABLE 2-continued

FIG. 6A/6B Layer Arrangement
Coating Thickness (μm): 9.275
Nb2O5 (μm): 3.175
SiO2 (μm): 6.099
Total Layers: 118

| Layer | Material | Thickness (nm) |
|---|---|---|
| 50 | SiO2 | 117.3189 |
| 51 | Nb2O5 | 57.34705 |
| 52 | SiO2 | 118.7372 |
| 53 | Nb2O5 | 57.87605 |
| 54 | SiO2 | 118.2473 |
| 55 | Nb2O5 | 57.80588 |
| 56 | SiO2 | 115.2186 |
| 57 | Nb2O5 | 56.22888 |
| 58 | SiO2 | 107.3296 |
| 59 | Nb2O5 | 50.31733 |
| 60 | SiO2 | 80.57623 |
| 61 | Nb2O5 | 29.04926 |
| 62 | SiO2 | 67.64751 |
| 63 | Nb2O5 | 39.90681 |
| 64 | SiO2 | 99.93217 |
| 65 | Nb2O5 | 54.4226 |
| 66 | SiO2 | 113.624 |
| 67 | Nb2O5 | 55.93844 |
| 68 | SiO2 | 117.4483 |
| 69 | Nb2O5 | 56.66708 |
| 70 | SiO2 | 115.3602 |
| 71 | Nb2O5 | 58.70031 |
| 72 | SiO2 | 113.8126 |
| 73 | Nb2O5 | 55.03245 |
| 74 | SiO2 | 109.3527 |
| 75 | Nb2O5 | 53.71783 |
| 76 | SiO2 | 87.78038 |
| 77 | Nb2O5 | 44.00093 |
| 78 | SiO2 | 61.97066 |
| 79 | Nb2O5 | 40.07847 |
| 80 | SiO2 | 72.65181 |
| 81 | Nb2O5 | 53.44348 |
| 82 | SiO2 | 99.99185 |
| 83 | Nb2O5 | 58.25613 |
| 84 | SiO2 | 105.2992 |
| 85 | Nb2O5 | 59.27326 |
| 86 | SiO2 | 103.3531 |
| 87 | Nb2O5 | 57.33131 |
| 88 | SiO2 | 92.65092 |
| 89 | Nb2O5 | 47.56535 |
| 90 | SiO2 | 72.87523 |
| 91 | Nb2O5 | 37.25349 |
| 92 | SiO2 | 69.74638 |
| 93 | Nb2O5 | 47.11861 |
| 94 | SiO2 | 92.44581 |
| 95 | Nb2O5 | 57.22467 |
| 96 | SiO2 | 100.4564 |
| 97 | Nb2O5 | 57.86897 |
| 98 | SiO2 | 100.8269 |
| 99 | Nb2O5 | 55.05754 |
| 100 | SiO2 | 92.59423 |
| 101 | Nb2O5 | 39.972 |
| 102 | SiO2 | 63.17161 |
| 103 | Nb2O5 | 35.08632 |
| 104 | SiO2 | 300.2094 |
| 105 | Nb2O5 | 52.89133 |
| 106 | SiO2 | 100.9649 |
| 107 | Nb2O5 | 57.19679 |
| 108 | SiO2 | 108.3576 |
| 109 | Nb2O5 | 54.56803 |
| 110 | SiO2 | 119.8437 |
| 111 | Nb2O5 | 143.8859 |
| 112 | SiO2 | 68.05159 |
| 113 | Nb2O5 | 15.98383 |
| 114 | SiO2 | 144.4671 |
| 115 | Nb2O5 | 54.58889 |
| 116 | SiO2 | 109.6031 |
| 117 | Nb2O5 | 56.89793 |
| 118 | SiO2 | 295.4826 |

TABLE 3

FIG. 7A/7B Layer Arrangement
Coating Thickness (μm): 11.71
Nb2O5 (μm): 4.736
SiO2 (μm): 6.974
Total Layers: 130

| Layer | Material | Thickness (nm) |
|---|---|---|
| 1 | Nb2O5 | 58.4 |
| 2 | SiO2 | 116.8 |
| 3 | Nb2O5 | 141.3 |
| 4 | SiO2 | 250.4 |
| 5 | Nb2O5 | 58.4 |
| 6 | SiO2 | 109.6 |
| 7 | Nb2O5 | 173.8 |
| 8 | SiO2 | 108.2 |
| 9 | Nb2O5 | 51.2 |
| 10 | SiO2 | 130.7 |
| 11 | Nb2O5 | 117.8 |
| 12 | SiO2 | 120.0 |
| 13 | Nb2O5 | 43.6 |
| 14 | SiO2 | 112.9 |
| 15 | Nb2O5 | 56.1 |
| 16 | SiO2 | 119.7 |
| 17 | Nb2O5 | 72.3 |
| 18 | SiO2 | 185.0 |
| 19 | Nb2O5 | 70.3 |
| 20 | SiO2 | 114.9 |
| 21 | Nb2O5 | 58.2 |
| 22 | SiO2 | 104.8 |
| 23 | Nb2O5 | 56.8 |
| 24 | SiO2 | 108.7 |
| 25 | Nb2O5 | 57.7 |
| 26 | SiO2 | 422.9 |
| 27 | Nb2O5 | 56.7 |
| 28 | SiO2 | 108.5 |
| 29 | Nb2O5 | 56.4 |
| 30 | SiO2 | 102.5 |
| 31 | Nb2O5 | 59.2 |
| 32 | SiO2 | 112.3 |
| 33 | Nb2O5 | 72.4 |
| 34 | SiO2 | 180.9 |
| 35 | Nb2O5 | 193.6 |
| 36 | SiO2 | 110.7 |
| 37 | Nb2O5 | 60.2 |
| 38 | SiO2 | 100.5 |
| 39 | Nb2O5 | 60.9 |
| 40 | SiO2 | 100.4 |
| 41 | Nb2O5 | 65.2 |
| 42 | SiO2 | 113.3 |
| 43 | Nb2O5 | 80.6 |
| 44 | SiO2 | 149.8 |
| 45 | Nb2O5 | 201.6 |
| 46 | SiO2 | 115.9 |
| 47 | Nb2O5 | 66.8 |
| 48 | SiO2 | 100.2 |
| 49 | Nb2O5 | 60.9 |
| 50 | SiO2 | 97.4 |
| 51 | Nb2O5 | 58.4 |
| 52 | SiO2 | 97.6 |
| 53 | Nb2O5 | 59.2 |
| 54 | SiO2 | 99.9 |
| 55 | Nb2O5 | 62.8 |
| 56 | SiO2 | 116.8 |
| 57 | Nb2O5 | 87.4 |
| 58 | SiO2 | 157.0 |
| 59 | Nb2O5 | 74.3 |
| 60 | SiO2 | 108.6 |
| 61 | Nb2O5 | 63.0 |
| 62 | SiO2 | 95.2 |
| 63 | Nb2O5 | 59.7 |
| 64 | SiO2 | 95.6 |
| 65 | Nb2O5 | 60.3 |
| 66 | SiO2 | 91.1 |
| 67 | Nb2O5 | 60.5 |
| 68 | SiO2 | 81.4 |
| 69 | Nb2O5 | 58.6 |
| 70 | SiO2 | 71.4 |
| 71 | Nb2O5 | 55.3 |
| 72 | SiO2 | 64.8 |
| 73 | Nb2O5 | 54.0 |
| 74 | SiO2 | 62.5 |
| 75 | Nb2O5 | 54.5 |
| 76 | SiO2 | 64.5 |
| 77 | Nb2O5 | 55.6 |
| 78 | SiO2 | 72.2 |
| 79 | Nb2O5 | 59.2 |
| 80 | SiO2 | 83.8 |
| 81 | Nb2O5 | 179.9 |
| 82 | SiO2 | 96.2 |
| 83 | Nb2O5 | 71.7 |
| 84 | SiO2 | 123.0 |
| 85 | Nb2O5 | 89.5 |
| 86 | SiO2 | 132.6 |
| 87 | Nb2O5 | 81.3 |
| 88 | SiO2 | 107.2 |
| 89 | Nb2O5 | 64.2 |
| 90 | SiO2 | 98.8 |
| 91 | Nb2O5 | 60.3 |
| 92 | SiO2 | 82.4 |
| 93 | Nb2O5 | 58.4 |
| 94 | SiO2 | 71.8 |
| 95 | Nb2O5 | 55.8 |
| 96 | SiO2 | 65.4 |
| 97 | Nb2O5 | 55.1 |
| 98 | SiO2 | 64.6 |
| 99 | Nb2O5 | 53.8 |
| 100 | SiO2 | 65.1 |
| 101 | Nb2O5 | 55.6 |
| 102 | SiO2 | 67.9 |
| 103 | Nb2O5 | 57.2 |
| 104 | SiO2 | 76.3 |
| 105 | Nb2O5 | 59.6 |
| 106 | SiO2 | 87.9 |
| 107 | Nb2O5 | 63.5 |
| 108 | SiO2 | 100.1 |
| 109 | Nb2O5 | 71.5 |
| 110 | SiO2 | 139.9 |
| 111 | Nb2O5 | 90.1 |
| 112 | SiO2 | 128.4 |
| 113 | Nb2O5 | 71.9 |
| 114 | SiO2 | 102.4 |
| 115 | Nb2O5 | 57.6 |
| 116 | SiO2 | 91.3 |
| 117 | Nb2O5 | 164.6 |
| 118 | SiO2 | 76.4 |
| 119 | Nb2O5 | 48.5 |
| 120 | SiO2 | 73.1 |
| 121 | Nb2O5 | 52.2 |
| 122 | SiO2 | 73.4 |
| 123 | Nb2O5 | 54.2 |
| 124 | SiO2 | 72.6 |
| 125 | Nb2O5 | 50.2 |
| 126 | SiO2 | 69.0 |
| 127 | Nb2O5 | 44.6 |
| 128 | SiO2 | 72.4 |
| 129 | Nb2O5 | 51.4 |
| 130 | SiO2 | 76.4 |

TABLE 4

FIG. 8 Layer Arrangement  
Coating Thickness (μm): 9.065  
Nb2O5 (μm): 3.541  
SiO2 (μm): 5.523  
Total Layers: 122

| Layer | Material | Thickness (nm) |
|---|---|---|
| 1 | Nb2O5 | 27.4 |
| 2 | SiO2 | 240.0 |
| 3 | Nb2O5 | 43.3 |
| 4 | SiO2 | 110.2 |
| 5 | Nb2O5 | 40.2 |
| 6 | SiO2 | 106.0 |
| 7 | Nb2O5 | 132.7 |
| 8 | SiO2 | 97.2 |
| 9 | Nb2O5 | 35.2 |
| 10 | SiO2 | 116.3 |
| 11 | Nb2O5 | 49.8 |
| 12 | SiO2 | 111.9 |
| 13 | Nb2O5 | 46.9 |
| 14 | SiO2 | 101.3 |
| 15 | Nb2O5 | 21.4 |
| 16 | SiO2 | 74.5 |
| 17 | Nb2O5 | 37.6 |
| 18 | SiO2 | 112.7 |
| 19 | Nb2O5 | 53.4 |
| 20 | SiO2 | 119.7 |
| 21 | Nb2O5 | 54.0 |
| 22 | SiO2 | 105.2 |
| 23 | Nb2O5 | 44.8 |
| 24 | SiO2 | 74.9 |
| 25 | Nb2O5 | 27.4 |
| 26 | SiO2 | 81.5 |
| 27 | Nb2O5 | 45.7 |
| 28 | SiO2 | 102.5 |
| 29 | Nb2O5 | 56.2 |
| 30 | SiO2 | 102.4 |
| 31 | Nb2O5 | 55.7 |
| 32 | SiO2 | 102.3 |
| 33 | Nb2O5 | 45.1 |
| 34 | SiO2 | 73.4 |
| 35 | Nb2O5 | 32.1 |
| 36 | SiO2 | 76.3 |
| 37 | Nb2O5 | 44.6 |
| 38 | SiO2 | 102.3 |
| 39 | Nb2O5 | 55.2 |
| 40 | SiO2 | 103.8 |
| 41 | Nb2O5 | 58.3 |
| 42 | SiO2 | 91.7 |
| 43 | Nb2O5 | 52.0 |
| 44 | SiO2 | 73.2 |
| 45 | Nb2O5 | 41.3 |
| 46 | SiO2 | 62.3 |
| 47 | Nb2O5 | 46.5 |
| 48 | SiO2 | 81.4 |
| 49 | Nb2O5 | 56.8 |
| 50 | SiO2 | 97.0 |
| 51 | Nb2O5 | 60.1 |
| 52 | SiO2 | 94.4 |
| 53 | Nb2O5 | 57.2 |
| 54 | SiO2 | 78.1 |
| 55 | Nb2O5 | 49.2 |
| 56 | SiO2 | 62.0 |
| 57 | Nb2O5 | 44.3 |
| 58 | SiO2 | 65.3 |
| 59 | Nb2O5 | 52.5 |
| 60 | SiO2 | 86.7 |
| 61 | Nb2O5 | 59.7 |
| 62 | SiO2 | 93.1 |
| 63 | Nb2O5 | 60.8 |
| 64 | SiO2 | 86.3 |
| 65 | Nb2O5 | 56.4 |
| 66 | SiO2 | 69.6 |
| 67 | Nb2O5 | 50.0 |
| 68 | SiO2 | 57.9 |
| 69 | Nb2O5 | 47.8 |
| 70 | SiO2 | 65.5 |
| 71 | Nb2O5 | 54.9 |
| 72 | SiO2 | 82.5 |
| 73 | Nb2O5 | 60.7 |
| 74 | SiO2 | 93.6 |
| 75 | Nb2O5 | 61.7 |
| 76 | SiO2 | 92.7 |
| 77 | Nb2O5 | 179.4 |
| 78 | SiO2 | 78.8 |
| 79 | Nb2O5 | 48.4 |
| 80 | SiO2 | 55.1 |
| 81 | Nb2O5 | 45.3 |
| 82 | SiO2 | 64.3 |
| 83 | Nb2O5 | 52.1 |
| 84 | SiO2 | 85.2 |
| 85 | Nb2O5 | 59.8 |
| 86 | SiO2 | 96.5 |
| 87 | Nb2O5 | 61.7 |
| 88 | SiO2 | 100.2 |
| 89 | Nb2O5 | 61.8 |
| 90 | SiO2 | 101.6 |
| 91 | Nb2O5 | 61.2 |
| 92 | SiO2 | 101.7 |
| 93 | Nb2O5 | 58.1 |
| 94 | SiO2 | 92.2 |
| 95 | Nb2O5 | 164.1 |
| 96 | SiO2 | 51.0 |
| 97 | Nb2O5 | 31.7 |
| 98 | SiO2 | 83.9 |
| 99 | Nb2O5 | 39.0 |
| 100 | SiO2 | 117.4 |
| 101 | Nb2O5 | 54.4 |
| 102 | SiO2 | 116.5 |
| 103 | Nb2O5 | 58.2 |
| 104 | SiO2 | 104.1 |
| 105 | Nb2O5 | 63.0 |
| 106 | SiO2 | 97.4 |
| 107 | Nb2O5 | 64.4 |
| 108 | SiO2 | 90.9 |
| 109 | Nb2O5 | 62.5 |
| 110 | SiO2 | 78.6 |
| 111 | Nb2O5 | 55.1 |
| 112 | SiO2 | 54.7 |
| 113 | Nb2O5 | 170.0 |
| 114 | SiO2 | 52.2 |
| 115 | Nb2O5 | 48.7 |
| 116 | SiO2 | 68.0 |
| 117 | Nb2O5 | 58.8 |
| 118 | SiO2 | 85.6 |
| 119 | Nb2O5 | 61.8 |
| 120 | SiO2 | 99.7 |
| 121 | Nb2O5 | 63.0 |
| 122 | SiO2 | 100.1 |

TABLE 5

FIG. 9 Layer Arrangement  
Coating Thickness (μm): 7.046  
Nb2O5 (μm): 2.615  
SiO2 (μm): 4.431  
Total Layers: 82

| Layer | Material | Thickness (nm) |
|---|---|---|
| 1 | Nb2O5 | 108.5 |
| 2 | SiO2 | 164.2 |
| 3 | Nb2O5 | 125.4 |
| 4 | SiO2 | 205.9 |
| 5 | Nb2O5 | 42.2 |
| 6 | SiO2 | 261.3 |
| 7 | Nb2O5 | 135.7 |
| 8 | SiO2 | 117.3 |

TABLE 5-continued

FIG. 9 Layer Arrangement
Coating Thickness (μm): 7.046
Nb2O5 (μm): 2.615
SiO2 (μm): 4.431
Total Layers: 82

| Layer | Material | Thickness (nm) |
|---|---|---|
| 9 | Nb2O5 | 39.7 |
| 10 | SiO2 | 107.8 |
| 11 | Nb2O5 | 46.8 |
| 12 | SiO2 | 81.7 |
| 13 | Nb2O5 | 25.5 |
| 14 | SiO2 | 60.0 |
| 15 | Nb2O5 | 46.8 |
| 16 | SiO2 | 160.9 |
| 17 | Nb2O5 | 51.1 |
| 18 | SiO2 | 93.6 |
| 19 | Nb2O5 | 64.3 |
| 20 | SiO2 | 85.2 |
| 21 | Nb2O5 | 41.9 |
| 22 | SiO2 | 54.5 |
| 23 | Nb2O5 | 36.4 |
| 24 | SiO2 | 86.5 |
| 25 | Nb2O5 | 57.7 |
| 26 | SiO2 | 102.3 |
| 27 | Nb2O5 | 63.0 |
| 28 | SiO2 | 100.1 |
| 29 | Nb2O5 | 51.7 |
| 30 | SiO2 | 66.7 |
| 31 | Nb2O5 | 31.8 |
| 32 | SiO2 | 62.6 |
| 33 | Nb2O5 | 53.6 |
| 34 | SiO2 | 93.8 |
| 35 | Nb2O5 | 62.5 |
| 36 | SiO2 | 84.5 |
| 37 | Nb2O5 | 56.8 |
| 38 | SiO2 | 63.2 |
| 39 | Nb2O5 | 43.0 |
| 40 | SiO2 | 52.1 |
| 41 | Nb2O5 | 48.9 |
| 42 | SiO2 | 74.9 |
| 43 | Nb2O5 | 60.5 |
| 44 | SiO2 | 89.9 |
| 45 | Nb2O5 | 60.5 |
| 46 | SiO2 | 82.3 |
| 47 | Nb2O5 | 40.6 |
| 48 | SiO2 | 51.8 |
| 49 | Nb2O5 | 42.9 |
| 50 | SiO2 | 79.2 |
| 51 | Nb2O5 | 60.5 |
| 52 | SiO2 | 96.4 |
| 53 | Nb2O5 | 61.8 |
| 54 | SiO2 | 87.7 |
| 55 | Nb2O5 | 52.3 |
| 56 | SiO2 | 62.1 |
| 57 | Nb2O5 | 42.5 |
| 58 | SiO2 | 62.7 |
| 59 | Nb2O5 | 51.0 |
| 60 | SiO2 | 85.4 |
| 61 | Nb2O5 | 54.9 |
| 62 | SiO2 | 109.8 |
| 63 | Nb2O5 | 41.9 |
| 64 | SiO2 | 230.5 |
| 65 | Nb2O5 | 170.1 |
| 66 | SiO2 | 141.5 |
| 67 | Nb2O5 | 43.0 |
| 68 | SiO2 | 123.0 |
| 69 | Nb2O5 | 35.5 |
| 70 | SiO2 | 57.9 |
| 71 | Nb2O5 | 145.9 |
| 72 | SiO2 | 91.3 |
| 73 | Nb2O5 | 43.8 |
| 74 | SiO2 | 129.6 |
| 75 | Nb2O5 | 40.3 |
| 76 | SiO2 | 164.8 |
| 77 | Nb2O5 | 117.9 |
| 78 | SiO2 | 42.4 |
| 79 | Nb2O5 | 31.9 |
| 80 | SiO2 | 201.0 |
| 81 | Nb2O5 | 183.8 |
| 82 | SiO2 | 262.7 |

PARTS LIST

10. Laser attenuator
12. Light source
14. Half-wave plate
16. Polarizing beamsplitter
20. Light dump element
30. Optical element
46, 48, 50, 52, 54. Graph
56. Curve
58. Curve
60. Graph
70. Substrate
80a1, 80a2 ... 80z1, 80z2. Layer
A. Attenuation curve for the average of S- and P-polarized light component
D, D1, D2. Difference curve
DS, DP. Deviation curve
E, K1, K2. Inset
P. Attenuation curve for P-polarized light component
S. Attenuation curve for S-polarized light component
$\lambda_1, \lambda_2$. Wavelength
$\theta_1, \theta_2$. Angle

The invention claimed is:

1. An optical element comprising:
at least one substrate having at least one surface; and
a plurality of layers formed on the at least one surface of the at least one substrate, the plurality of layers including alternating first and second layers, the first layers having a first refractive index, $n_L$, and the second layers having a second refractive index, $n_H$, greater than the first refractive index, wherein the plurality of layers exhibit a spectral characteristic, the spectral characteristic providing, for incident light at a predetermined wavelength and directed toward the optical element within a range of incident angles bounded by a first incident angle $\theta_1$ and a second incident angle $\theta_2$, wherein the first and second incident angles $\theta_1$ and $\theta_2$ are between 0 and 80 degrees and wherein the difference between the first and second incident angles $\theta_1$ and $\theta_2$ is at least 1 degree, substantially linear polarization-averaged attenuation of the incident light energy given by:

$$A\theta_n = -\log_{10}((Tp_n + Ts_n)/2)$$

wherein, for any incident angle $\theta_n$ that lies within the range between and including angles $\theta_1$ and $\theta_2$,
$A\theta_n$ is the corresponding polarization-averaged attenuation in terms of optical density,
$Tp_n$ is the transmission, at angle $\theta_n$, of light energy of a first polarization axis, and
$Ts_n$ is the transmission, at angle $\theta_n$, of light energy of a second polarization axis that is orthogonal to the first polarization axis, and
wherein the polarization-averaged attenuation $A\theta_n$ at angle $\theta_1$ is less than or equal to an optical density value of 0.2 and the polarization-averaged attenuation $A\theta_n$ at angle $\theta_2$ exceeds an optical density value of 4.

2. The optical element of claim 1 wherein the difference between the first and second incident angles $\theta_1$ and $\theta_2$ exceeds 2 degrees.

3. The optical element of claim 1 wherein the difference between the first and second incident angles $\theta_1$ and $\theta_2$ exceeds 3 degrees.

4. The optical element of claim 1 wherein the polarization-averaged attenuation at angle $\theta_1$ is less than or equal to an optical density value of 0.1.

5. The optical element of claim 1 wherein the polarization-averaged attenuation at angle $\theta_2$ exceeds an optical density value of 5.

6. The optical element of claim 1 wherein the spectral characteristic applies for light having a cone half angle in excess of 5 degrees.

7. The optical element of claim 1 wherein the range of angles is defined about a central angle of approximately 45 degrees.

8. The optical element of claim 1 wherein attenuation of light energy along the first polarization axes, in optical density, differs by less than about 0.1 from attenuation along the second polarization axis.

9. The optical element of claim 1 wherein attenuation of light energy along the first polarization axis differs from attenuation along the second polarization axis by an optical density of less than about 0.02.

10. The optical element of claim 1 wherein the plurality of layers includes one or more of: $SiO_2$, $Ta_2O_5$, $Nb_2O_5$, $HfO_2$, $TiO_2$, and $Al_2O_5$.

11. The optical element of claim 1 wherein the at least one surface is a first surface and the at least one substrate further comprises a second surface and wherein the second surface has an anti-reflection coating.

12. The optical element of claim 1 wherein the substantially linear polarization-averaged attenuation increases with increasing incident angle.

13. The optical element of claim 1 wherein the substantially linear polarization-averaged attenuation decreases with increasing incident angle.

14. The optical element of claim 1 wherein angles $\theta_1$ and $\theta_2$ are non-normal.

* * * * *